Patented June 10, 1924.

1,496,780

UNITED STATES PATENT OFFICE.

WERNER LANGE, OF BERLIN-FRIEDENAU, AND LUDWIG NEUMANN, OF BERLIN, GERMANY, ASSIGNORS TO ACTIEN GESELLSCHAFT FÜR ANILIN FABRIKATION, OF BERLIN, GERMANY.

TETRAKISAZO DYES.

No Drawing. Application filed December 16, 1922. Serial No. 607,417.

*To all whom it may concern:*

Be it known that we, WERNER LANGE and LUDWIG NEUMANN, citizens of the German Republic, and residents of Berlin-Friedenau, Germany, and Berlin, Germany, have invented certain new and useful Improvements in Tetrakisazo Dyes, of which the following is a specification.

Our invention relates to the manufacture of new valuable tetrakisazo dyes which correspond to the general formula:

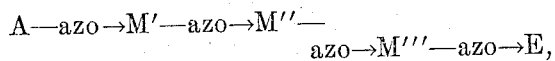

A is a residue of an amino compound of the aromatic series, M′, M″ are residues of aromatic amino compounds, M‴ is a residue of an aminooxynaphthalene sulfonic acid and E is a compound derived from a cyclic hydrocarbon.

These dyestuffs may be obtained by diazotizing an amino arylsulfonic acid, combining it with a middle component of the aromatic series, diazotizing the product and combining it with a middle component of the aromatic series, diazotizing the disazo dyestuff thus obtained and combining with an aminooxynaphthalene sulfonic acid, diazotizing again and coupling with a compound which is derived from a cyclic hydrocarbon.

The new tetrakisazo dyes in the shape of pulverized dry sodium salts are dark powders soluble in water to dark colored solutions, not being altered by sodium hydroxide but from which the dyes are separated by hydrochloric acid, being insoluble in alcohol, ether, benzene. Strong reducing agents decompose the dyes. From an alkaline bath cotton is dyed gray to greenish gray tints of an excellent fastness.

The following examples may serve to illustrate our invention, the parts being by weight:

1. The azo compound of 30.3 parts of 2-aminonaphthalene-4, 8-disulfonic acid and 14.4 parts of 1-amino-naphthalene is combined after diazotation with 22 parts of 1-aminonaphthalene-6-sulfonic acid in the presence of sodium acetate. The disazodyestuff is dissolved by addition of sodium carbonate and diazotized with 6 parts of sodium nitrite and hydrochloric acid at the temperature of 0° C. The product is combined with 21.5 parts of 1-amino-8-oxynaphthalene-4-sulfonic acid in a solution which is alkaline with sodium carbonate. The dyestuff is separated by common salt. It is dissolved again in water, diazotized in the presence of hydrochloric acid with 5 parts of sodium nitrite and combined with a solution of 11 parts of 4-nitro-1.3-diaminobenzene in 18 parts of hydrochloric acid of 23° Bé. specific gravity and 250 parts of water. After stirring for some hours the mineral acid is bound by addition of sodium acetate. The combination being finished sodium carbonate is added and the dye is separated by common salt. It dyes on cotton gray tints. If in the foregoing example the 1-amino-8-oxynaphthalene-4-sulfonic acid is substituted by the like quantity of 2-amino-8-oxynaphthalene-6-sulfonic acid a dye is obtained which produces on cotton greenish gray tints.

2. The trisazo dye: 2-amino-4.8-disulfonic acid-azo-1-aminonaphthalene-azo-1-aminonaphthalene-6-sulfonic acid-azo-2-amino-8-oxynaphthalene-6-sulfonic acid is combined after diazotation with 21 parts of 2-oxynaphthalene-7-sulfonic acid in a solution containing sodium carbonate. The dye is finished and separated in the usual manner; it dyes on cotton bluish gray tints.

By substituting 13 parts of 1-phenyl-3-methyl-5-pyrazolone for 2-oxy-naphthalene-7-sulfonic acid a dye is obtained producing greenish gray tints.

3. The disazo dye: 2-aminonaphthalene-4.8-disulfonic acid-azo-1-aminonaphthalene-azo-1-aminonaphthalene-6-sulfonic acid (see Example 1) is combined after diazotation with 29 parts of 1-amino-8-oxynaphthalene-3.6-disulfonic acid in a solution containing sodium carbonate. The combination being finished the dye is separated by addition of common salt and of hydrochloric acid, filtered off and redissolved in water, diazotized with 4.5 parts of sodium nitrite in the presence of hydrochloric acid and combined with 9.3 parts of 4-chloro-1.3-diaminobenzene in a hydrochloric solution. The mineral acid is bound by addition of sodium acetate. The dye is finished in the usual manner. It dyes reddish bluegray tints.

4. The diazo compound of 29.7 parts of 1-aminobenzene-2.5-disulfonic acid (sodium salt) is combined with 22.3 parts of 1-aminonaphthalene-7-sulfonic acid by addition of sodium acetate. The azo-dye thus obtained is diazotized and combined with 14.3 parts of 1-aminonaphthalene. The disazo dye is separated by common salt and filtered off. It is redissolved and diazotized again with hydrochloric acid and 5.2 parts of sodium nitrite and combined with a solution containing sodium carbonate and 18 parts 2-amino-8-oxynaphthalene-6-sulfonic acid. The trisazo dyestuff is isolated and diazotized again with hydrochloric acid and 4.5 parts of sodium nitrite and combined with 9.3 parts of 1-chloro-2.4-diaminobenzene dissolved in hydrochloric acid. The combination is finished by adding slowly sodium acetate and by heating, sodium carbonate is added and the dye is separated in the usual manner. It dyes greenish gray tints.

What we claim is,—

1. The herein described tetrakisazo dyes being in the shape of their sodium salts dark powders soluble in water to dark colored solutions not being altered by sodium hydroxide, but from which the dyes are separated by hydrochloric acid, being insoluble in alcohol, ether, benzene, being destroyed by strong reducing agents, dyeing cotton gray to greenish gray tints and corresponding to the general formula: A—azo→M′—azo→M″—azo→M‴—azo→E, in which A, M′ and M″ are residues of amino compounds of the aromatic series, M‴ a residue of an aminooxynaphthalene sulfonic acid and E the residue of a compound derived from cyclic hydrocarbon.

2. The herein-described tetrakisazo dyes being in the shape of their sodium salts dark powders soluble in water to dark colored solutions, not being altered by sodium hydroxide, but from which the dyes are separated by hydrochloric acid, being insoluble in alcohol, ether, benzene, being destroyed by strong reducing agents, dyeing cotton gray to greenish gray tints and corresponding to the general formula: A—azo→M′—azo→M″—azo→M‴—azo→E, in which A is 2-aminonaphthalene-4.8-disulfonic acid, M′ and M″ are residues of amino compounds of the aromatic series, M‴ is a residue of an amino-oxynaphthalene sulfonic acid and E the residue of a compound derived from a cyclic hydrocarbon.

3. The herein-described tetrakisazo dyes being in the shape of their sodium salts dark powders soluble in water to dark colored solutions, not being altered by sodium hydroxide, but from which the dyes are separated by hydrochloric acid, being destroyed by strong reducing agents, dyeing cotton gray to greenish gray tints and corresponding to the general formula: 2-aminonaphthalene-4.8-disulfonic acid—azo→M′—azo→M″—azo→2-amino-8-oxynaphthalene-6-sulfonic acid—azo→E, M′ and M″ meaning residues of amino compounds of the aromatic series and E meaning the residue of a compound derived from a cyclic hydrocarbon.

4. The herein-described tetrakisazo dye being in the shape of its sodium salt a dark powder soluble in water to a dark colored solution, not being altered by sodium hydroxide, but from which the dye separates by hydrochloric acid, being destroyed by strong reducing agents, dyeing cotton greenish gray tints and corresponding to the formula: 2-aminonaphthalene-4.8-disulfonic acid—azo→1—aminonaphthalene—azo→1-aminonaphthalene-6-sulfonic acid—azo→2 amino-8-oxynaphthalene-6-sulfonic acid—azo→nitro-1.3-diamino-benzene.

5. The herein-described tetrakisazo dye being in the shape of its sodium salt a dark powder soluble in water to a dark colored solution not being altered by sodium hydroxide but from which the dye is separated by hydrochloric acid, being destroyed by strong reducing agents, dyeing cotton greenish gray tints and corresponding to the formula: 2 - aminonaphthalene - 4.8 - disulfonic acid—azo → alpha-naphthylamine—azo → 1-naphthylamine-6-sulfonic acid—azo → 2-amino-8-oxynaphthalene-6-sulfonic acid—azo→nitro-meta-phenylenediamine.

In testimony whereof we affix our signatures in presence of a witness.

WERNER LANGE.
LUDWIG NEUMANN.

Witness:
E. HOLTZORMAN.